United States Patent
Imanishi (10) Patent No.: US 12,397,788 B2
(45) Date of Patent: Aug. 26, 2025

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Yuki Imanishi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 120 days.

(21) Appl. No.: 18/517,171

(22) Filed: Nov. 22, 2023

(65) Prior Publication Data
US 2024/0174224 A1   May 30, 2024

(30) Foreign Application Priority Data
Nov. 25, 2022 (JP) .................. 2022-188375

(51) Int. Cl.
*B60W 30/12*  (2020.01)
*B60W 10/20*  (2006.01)
*B60W 50/14*  (2020.01)

(52) U.S. Cl.
CPC ............ *B60W 30/12* (2013.01); *B60W 10/20* (2013.01); *B60W 50/14* (2013.01); *B60W 2510/202* (2013.01)

(58) Field of Classification Search
CPC ...... B60W 30/08; B60W 30/09; B60W 10/06; B60W 10/10; B60W 10/18; B60W 10/20; B60W 2050/146; B60W 2520/14; B60W 2540/18; B60W 2050/143;
(Continued)

(56) References Cited

U.S. PATENT DOCUMENTS

| | | | | |
|---|---|---|---|---|
| 10,882,518 | B2* | 1/2021 | Saiki | B62D 15/0265 |
| 11,335,195 | B2* | 5/2022 | Oyama | G06Q 10/047 |
| 12,148,302 | B2* | 11/2024 | Oyama | H04L 67/52 |

(Continued)

FOREIGN PATENT DOCUMENTS

| | | |
|---|---|---|
| CN | 110497843 | 11/2019 |
| CN | 112477857 | 3/2021 |

(Continued)

OTHER PUBLICATIONS

Japanese Notice of Allowance for Japanese Patent Application No. 2022-188375 mailed Mar. 5, 2025.

*Primary Examiner* — John Kwon
(74) *Attorney, Agent, or Firm* — Amin, Turocy & Watson, LLP (57) ABSTRACT

A vehicle control device includes a storage medium configured to store a computer-readable instruction and a processor connected to the storage medium, in which the processor executes the computer-readable instruction, thereby recognizing a surrounding situation of a vehicle, generating a target route of the vehicle on the basis of the recognized surrounding situation and performing steering control of the vehicle along the target route, and stopping, by the processor, the steering control when it is determined that a deviation between a traveling position of the vehicle and the target route is equal to or greater than a threshold value, and a time taken until the vehicle deviates from the traveling lane of the vehicle is equal to or less than a predetermined time.

9 Claims, 7 Drawing Sheets

(58) Field of Classification Search
CPC ....... B60W 2520/10; B60W 2520/105; B60W 2710/18; G01C 21/20; G01C 13/931; G01C 2013/93185

See application file for complete search history.

(56) References Cited

U.S. PATENT DOCUMENTS

| | | |
|---|---|---|
| 2015/0344068 A1 | 12/2015 | Taniguchi |
| 2019/0315346 A1 | 10/2019 | Yoo et al. |
| 2021/0155242 A1* | 5/2021 | Taniguchi ............. B60W 50/10 |
| 2022/0396286 A1 | 12/2022 | Li et al. |
| 2023/0035819 A1* | 2/2023 | Kume .................. B60W 50/16 |
| 2023/0211824 A1* | 7/2023 | Sakaguchi ............ B60W 30/12 |
| | | 701/41 |

FOREIGN PATENT DOCUMENTS

| | | |
|---|---|---|
| CN | 113264051 | 8/2021 |
| JP | 2002-331849 | 11/2002 |
| JP | 2009-214680 | 9/2009 |
| JP | 2009-226981 | 10/2009 |
| WO | 2014/109307 | 7/2014 |

\* cited by examiner

| CONTROL | TIME TO LINE CROSSING(TTLC) |
|---|---|
| LANE DEVIATION WARNING WHEN LKAS IS EXECUTED | FIRST TIME |
| LANE DEVIATION WARNING WHEN LKAS IS STOPPED | FIRST TIME OR SECOND TIME (FIRST TIME<SECOND TIME) |
| LKAS IS STOPPED | THIRD TIME (FIRST TIME OR MORE, SECOND TIME OR LESS) |

VEHICLE CONTROL DEVICE, VEHICLE CONTROL METHOD, AND STORAGE MEDIUM

The application is based on Japanese Patent Application No. 2022-188375 filed on Nov. 25, 2022, the content of which is incorporated herein by reference.

BACKGROUND

Field of the Invention

The present invention relates to a vehicle control device, a vehicle control method, and a storage medium.

Description of Related Art

Conventionally, lane keeping control is known in which a vehicle is controlled so that it travels within a traveling lane. For example, Japanese Unexamined Patent Application, First Publication No. 2009-214680 discloses a technology of stopping lane keeping control when a steering amount of a steering wheel of a driver, which is equal to or greater than a cancellation determination threshold value, is detected.

In this manner, the conventional technology stops lane keeping control on the basis of only the steering torque applied by the driver without considering a traveling environment of a vehicle. As a result, for example, when a vehicle is traveling in a lane with a wide lane width, lane keeping control may be stopped and its continuity may be impaired in some cases, even though the driver does not intend to deviate from the lane.

SUMMARY

The present invention has been made in view of such circumstances, and an object thereof is to provide a vehicle control device, a vehicle control method, and a storage medium that can improve continuity of lane keeping control for vehicles. Consequently, this will contribute to a development of a sustainable transportation system.

The vehicle control device, the vehicle control method, and the storage medium according to the present invention have adopted the following configuration.

(1): A vehicle control device according to one aspect of the present invention includes a storage medium configured to store a computer-readable instruction, and a processor connected to the storage medium, in which the processor executes the computer-readable instruction, thereby recognizing a surrounding situation of a vehicle, generating a target route of the vehicle on the basis of the recognized surrounding situation and performing steering control of the vehicle along the target route, and stopping, by the processor, the steering control when it is determined that a deviation between a traveling position of the vehicle and the target route is equal to or greater than a threshold value, and a time taken until the vehicle deviates from the traveling lane of the vehicle is equal to or less than a predetermined time.

(2): In the aspect of (1) described above, the processor may cause a warning device to operate when it is determined that the time taken until the vehicle deviates from the traveling lane of the vehicle is equal to or less than a warning transmission time, and the predetermined time may a time longer than the warning transmission time.

(3): In the aspect of (2) described above, the predetermined time may be a time longer than the warning transmission time during the steering control.

(4): In the aspect of (2) described above, the predetermined time may be a time shorter than the warning transmission time while the steering control is stopped.

(5): In the aspect of (4) described above, the warning transmission time while the steering control is stopped may be set to one of a first time and a second time longer than the first time, and the predetermined time may be set as a time between the first time and the second time.

(6): In the aspect of (1) described above, when the time is equal to or less than the predetermined time and it is determined that steering of the occupant of the vehicle is detected, even if a traveling position of the vehicle changes to a position where the time is longer than the predetermined time, the processor may continuously determine that the time is equal to or less than the predetermined time while the steering of the occupant is detected.

(7): In the aspect of (1) described above, the steering control may be a control that applies a reaction force to a steering torque applied by an occupant of the vehicle to cause the vehicle to travel along the traveling lane.

(8): A vehicle control method according to another aspect of the present invention includes, by a computer, recognizing a surrounding situation of a vehicle, generating a target route of the vehicle on the basis of the recognized surrounding situation and performing steering control of the vehicle along the target route, and stopping the steering control when it is determined that a deviation between a traveling position of the vehicle and the target route is equal to or greater than a threshold value, and a time taken until the vehicle deviates from the traveling lane of the vehicle is equal to or less than a predetermined time.

(9): A computer-readable non-transitory storage medium according to still another aspect of the present invention stores a program causing a computer to execute recognizing a surrounding situation of a vehicle, generating a target route of the vehicle on the basis of the recognized surrounding situation and performing steering control of the vehicle along the target route, and stopping the steering control when it is determined that a deviation between a traveling position of the vehicle and the target route is equal to or greater than a threshold value, and a time taken until the vehicle deviates from the traveling lane of the vehicle is equal to or less than a predetermined time.

According to the aspects of (1) to (9), it is possible to improve continuity of lane keeping control for vehicles.

DESCRIPTION OF EMBODIMENTS

Embodiments of a vehicle control device, a vehicle control method, and a storage medium of the present invention will be described below with reference to the drawings. The vehicle control device according to the present embodiment continues lane keeping support control when there is enough time for a host vehicle M to deviate from the lane, even if a deviation between a traveling lane in which a vehicle travels and a target route is large. As a result, it can improve continuity of lane keeping support control even when the vehicle travels in a lane with a wide lane width. Details of the vehicle control device according to the present embodiment will be described below.

[Overall Configuration]

Figure 1:
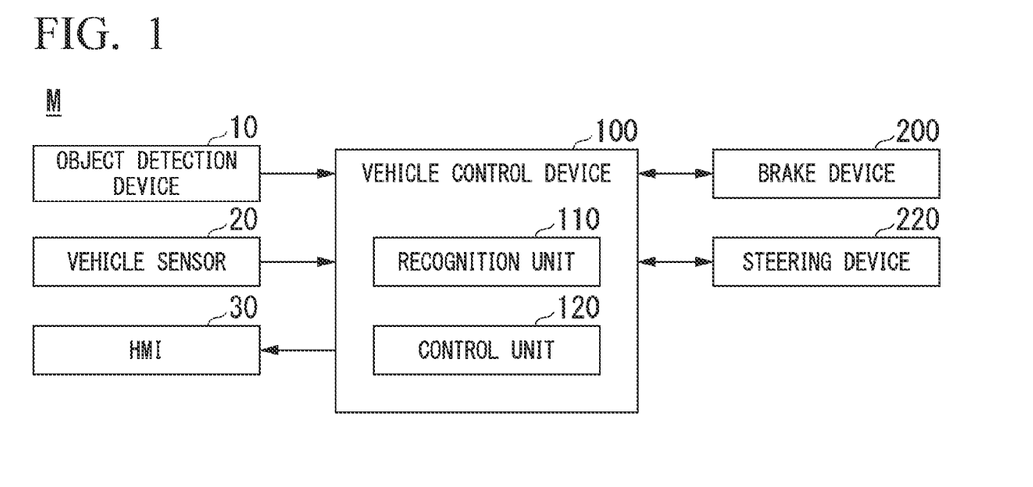
FIG. 1 is a configuration diagram which mainly shows a vehicle control device according to an embodiment.

FIG. 1 is a block diagram which mainly shows a vehicle control device 100 according to an embodiment. The vehicle control device 100 is mounted in a vehicle. In addition to the vehicle control device 100, this vehicle (hereinafter referred to as a vehicle M) is equipped with, for example, an object detection device 10, a vehicle sensor 20, an HMI 30, a brake device 200, a steering device 220, and the like. Note that the configuration shown in FIG. 1 is just an example, and a part of the configuration may be omitted, or another configuration may be added thereto. Although the vehicle M is equipped with a driving force output device such as an engine and a traveling motor, illustration and description thereof will be omitted.

The object detection device 10 includes, for example, some or all of a camera, a radar device, a light detection and ranging (LIDAR), a sensor fusion device, and the like. The object detection device 10 is a device for detecting an object, with at least a detection range of a traveling direction side of the vehicle M. The camera is, for example, a digital camera using a solid-state imaging device such as a charge coupled device (CCD) or a complementary metal oxide semiconductor (CMOS). The camera can be attached to any place on the vehicle M. When the front is imaged, the camera is attached to a top of the front windshield or a rear surface of the rearview mirror. For example, the camera periodically and repeatedly captures of images of surroundings of the vehicle M. The camera may be a stereo camera or a distance sensor. The radar device emits radio waves such as millimeter waves to the surroundings of the vehicle M, and detects radio waves (reflected waves) reflected by an object to detect at least a position (a distance and a direction) of the object. The radar device may detect the position and a speed of an object according to a frequency modulated continuous wave (FM-CW) method. LIDAR emits light (or electromagnetic waves with a wavelength close to that of light) to the surroundings of the vehicle M and measures scattered light. LIDAR detects a distance to a target on the basis of a time from light emission to light reception. The emitted light is, for example, a pulsed laser light. A sensor fusion device performs sensor fusion processing on results of detection by some or all of a camera, a radar device, and an LIDAR to recognize the position, type, speed, and the like of an object. The object detection device 10 may include an image analysis device that exclusively performs camera image analysis instead of the sensor fusion device. This image analysis device may be one function of the vehicle control device 100. The object detection device 10 outputs a result of recognition to the vehicle control device 100.

The vehicle sensor 20 includes a vehicle speed sensor that detects a speed of the vehicle M, an acceleration sensor that detects the acceleration, a yaw rate sensor that detects the angular speed around the vertical axis, an azimuth sensor that detects a direction of the vehicle M, and the like.

The HMI 30 is a notification device that presents various types of information to an occupant of a host vehicle M1. The HMI 30 receives an input operation from the occupant. The HMI 30 includes various display devices, speakers, buzzers, touch panels, switches, keys, and the like. The HMI 30 operates to issue a warning under control of a control unit 120, which will be described below. The HMI 30 is an example of a "warning device."

Prior to description of the vehicle control device 100, the brake device 200 and the steering device 220 will be described.

The brake device 200 includes, for example, a brake caliper, a cylinder that transmits hydraulic pressure to the brake caliper, an electric motor that causes the cylinder to generate hydraulic pressure, and a brake ECU. The brake ECU controls the electric motor according to information input from the vehicle control device 100 or information input from a driving operator (not shown) so that a brake torque corresponding to a braking operation is output to each wheel. The brake device 200 may include a mechanism for transmitting the hydraulic pressure generated by operating the brake pedal to the cylinder via a master cylinder as a backup mechanism. The brake device 200 is not limited to the configuration described above, and may be an electronically controlled hydraulic brake device that transmits the hydraulic pressure of the master cylinder to the cylinder.

Figure 2:
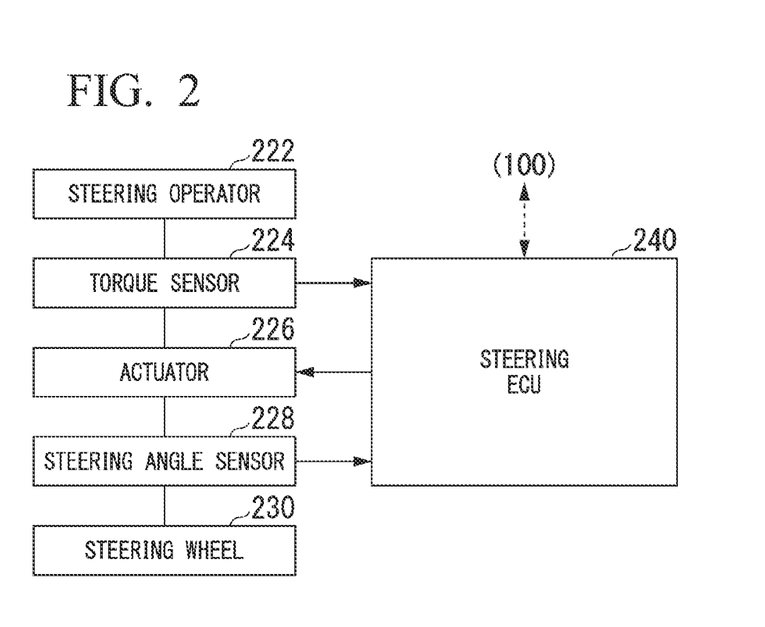
FIG. 2 is a configuration diagram of a steering device.

FIG. 2 is a configuration diagram of the steering device 220. The steering device 220 includes, for example, a steering operator 222, a torque sensor 224, an actuator 226, a steering angle sensor 228, and a steering wheel 230. These components are mechanically connected by a connection unit 232 that includes a steering shaft, a gear mechanism, and the like. Note that the connection unit 232 may have a function of temporarily releasing the connection. Furthermore, the steering device 220 includes a steering electronic control unit (ECU) 240. Note that the steering device 220 may be a so-called steer-by-wire steering device in which there is no mechanical connection between the steering operator 222 and the steering wheel 230.

The steering operator 222 is, for example, a steering wheel. Alternatively, the steering operator 222 may be a modified steering wheel, a joystick, a lever, a cross key, or other steering operator. In the following description, it is assumed that the steering operator 222 is a steering wheel. The steering operator 222 transmits a rotational force (hereinafter referred to as a "torque." When the steering operation is not a rotational operation, "force" in the present invention is not limited to a "torque") to the connection unit 232 when the steering operator 222 is rotated. At least a portion of the connection unit 232 operates as a rotating shaft. The torque sensor 224 detects a torque applied to the steering operator 222 and outputs it to a steering ECU 240. The actuator 226 is, for example, a motor, a stator of which is connected to the vehicle body, and the rotor rotates together with the connection unit 232. The actuator 226 outputs force to the coupling portion in response to an instruction from the steering ECU 240, thereby realizing a so-called power steering function. When the actuator 226 outputs a torque to the connection unit 232, the torque is also transmitted to the steering operator 222. By outputting a minute torque from the actuator 226, vibrations are transmitted to the hands of a driver of the vehicle M, making it possible to give some kind of awareness. In addition, the actuator 226 operates to apply reaction force to the torque applied to the steering operator 222 and suppress the steering operation. This realizes driving assistance such as a lane keeping assist system (LKAS). Although an actuator for realizing the power steering function and an actuator for outputting the reaction force may be provided separately, they are herein expressed as one. The steering angle sensor detects a steering angle of the steering wheel 230 and outputs it to the steering ECU 240. The steering ECU 240 operates the actuator 226 on the basis of the information input from the torque sensor 224 and the steering angle sensor 228 or in response to an instruction from the vehicle control device 100.

Returning to FIG. 1, the vehicle control device 100 includes, for example, a recognition unit 110 and a control unit 120. These components are realized by, for example, a hardware processor such as a central processing unit (CPU) executing a program (software), respectively. In addition, some or all of these components may be realized by hardware (a circuit unit: including circuitry) such as large scale integration (LSI), an application specific integrated circuit (ASIC), a field-programmable gate array (FPGA), or a graphics processing unit (GPU), or may be realized by software and hardware in cooperation. A program may be stored in advance in a storage device (a storage device having a non-transitory storage medium) such as an HDD or flash memory of the vehicle control device 100, or may be stored in a detachable storage medium such as a DVD or a CD-ROM and installed in the HDD or flash memory of the vehicle control device 100 by the storage medium (non-transitory storage medium) being attached to a drive device.

The recognition unit 110 recognizes a surrounding situation of the vehicle M on the basis of information input from the object detection device 10. The recognition unit recognizes, for example, a type, a position, a speed, an acceleration, and the like of an object in the surroundings of the vehicle M. The position of the object is recognized as, for example, a position on absolute coordinates with a representative point of the vehicle M (a center of gravity, a center of a drive shaft, or the like) as the origin, and is used for control. The position of an object may be expressed by a representative point such as the center of gravity or a corner of the object, or may be expressed by an expressed area. A "state" of an object may include the acceleration, the jerk, or a "behavioral state" (for example, whether it is changing lanes or is about to change lanes) of the object. In this manner, the recognition unit 110 recognizes an object that is present at least on the traveling direction side of the vehicle M and whose contact needs to be avoided by the vehicle M.

Furthermore, the recognition unit 110 recognizes, for example, a lane (a traveling lane) in which the vehicle M is traveling. For example, the recognition unit recognizes a position and a posture of the vehicle M with respect to the lane. The recognition unit 110 may also recognize, for example, a deviation of the reference point of the vehicle M from a center of the lane and an angle of the traveling direction of the vehicle M formed with respect to a line connecting the center of the lane as a relative position and posture of the vehicle M with respect to the traveling lane. Instead of this, the recognition unit 110 may recognize the position or the like of the reference point of the vehicle M with respect to either side edge (a road division line or a road boundary) of the traveling lane as the relative position of the vehicle M with respect to the traveling lane.

The control unit 120 generates a target route TR of the vehicle M on the basis of the surrounding situation recognized by the recognition unit 110, and performs steering control of the vehicle M along the generated target route TR. In the present embodiment, steering control refers to an LKAS that applies reaction force to a torque applied to the steering operator 222 in a direction that deviates from the target route TR, and suppresses a steering operation in the direction of the deviation when the vehicle M has traveled in the direction that deviates from the target route TR.

Figure 3:
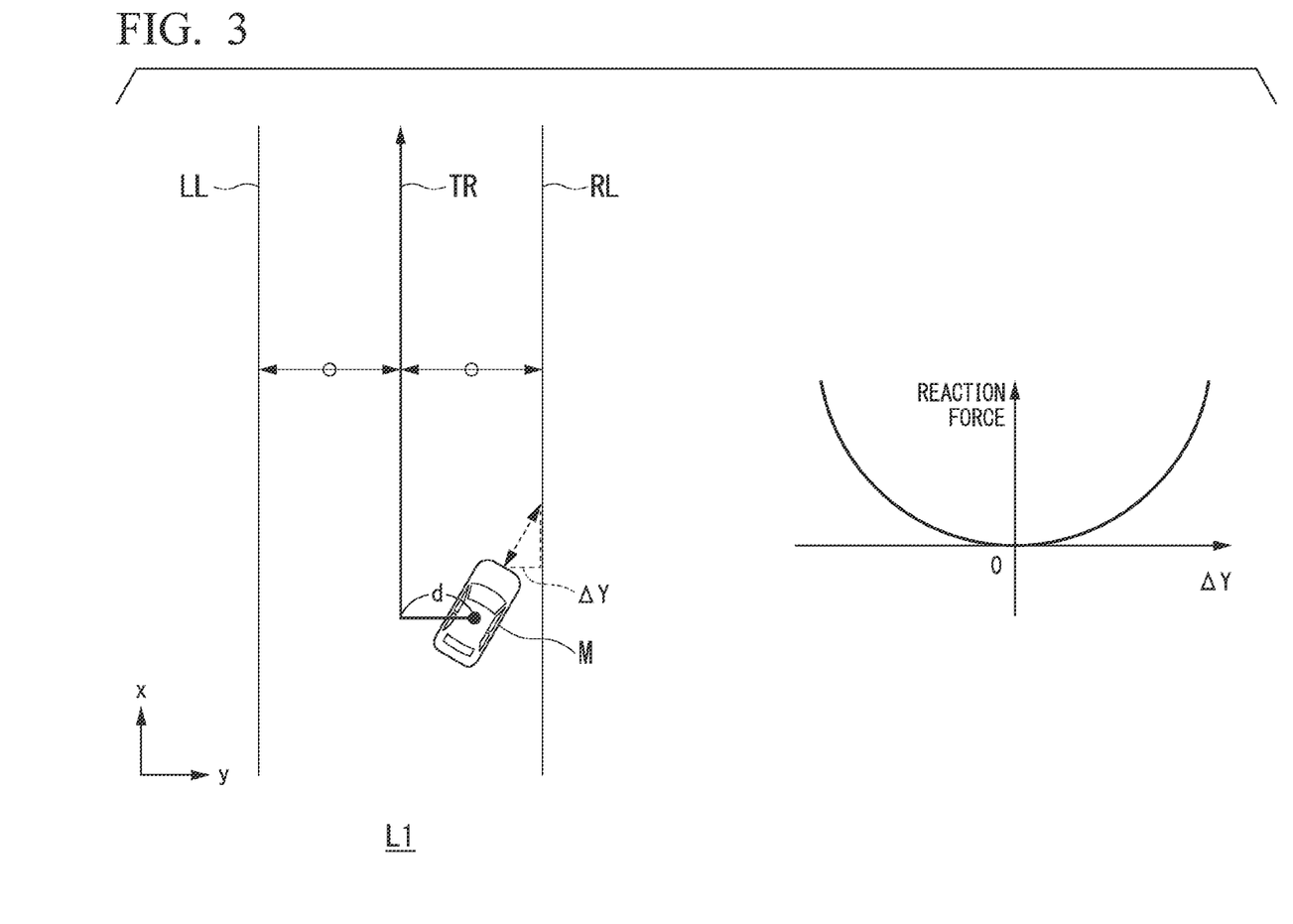
FIG. 3 is a diagram for describing a target route TR of a vehicle M generated by a control unit and an operation of and an LKAS.

FIG. 3 is a diagram for describing the target route TR of the vehicle M generated by the control unit 120 and an operation of the LKAS. FIG. 3 shows a situation in which the vehicle M is traveling along a lane L1. The control unit 120 generates, for example, the target route TR as a midline between a left road marking line LL and a right road marking line RL present in front of the vehicle M recognized by the recognition unit 110. When a road marking line recognized by the recognition unit 110 is only on one side, the control unit 120 generates a line shifted by a predetermined width based on the recognized road marking line on one side as the target route TR. Alternatively, the control unit 120 may generate the target route TR on the basis of information on left and right road markings (or one of them) that were recently recognized and stored as the relative position of the vehicle M.

Furthermore, the control unit 120 calculates a deviation (a distance) d between the generated target route TR and the vehicle M. For example, the control unit 120 calculates a distance between the generated target route TR and the center of gravity of the vehicle M as the deviation d. Furthermore, the control unit 120 detects whether the steering torque detected by the torque sensor 224 is in the direction that deviates from the target route TR. Furthermore, the control unit 120 calculates a time to line crossing (TTLC) until the vehicle M crosses either the left road marking line LL or the right road marking line RL on the basis of a current speed and acceleration of the vehicle M detected by the vehicle sensor 20. More specifically, for example, the control unit 120 calculates, as the TTLC, a time until a distance $\Delta Y$ between a center of a front end of the vehicle M and the road marking line becomes zero in a y-axis direction in FIG. 3. TTLC can also be expressed as a time until the vehicle M deviates from the traveling lane. As shown in a graph on a right side of FIG. 3, the LKAS is a control that increases, as the distance $\Delta Y$ increases in a positive direction (that is, to the right), a reaction force applied to a steering operation in a corresponding direction, and conversely, as the distance $\Delta Y$ increases in a negative direction (that is, to the left), increases the reaction force applied to the steering operation in a corresponding direction.

The control unit 120 determines whether the calculated deviation d is equal to or greater than a threshold value Th, whether the detected steering torque is in the direction that deviates from the target route TR, and whether the TTLC is equal to or less than a predetermined time, and when it is determined that the detected deviation d is equal to or greater than the threshold value Th, that the detected steering torque is in the direction that deviates from the target route TR, and that the TTLC is equal to or less than a predetermined time, it stops the LKAS. Here, "the deviation d is equal to or greater than the threshold value Th" more precisely means that "a period during which the deviation d is equal to or greater than the threshold value Th has continued for a specified time value (for example, 0.5 seconds) or more." That is, the control unit 120 according to the present embodiment controls whether to continue the LKAS, in further consideration of the surrounding situation of the vehicle M, in contrast to a conventional technology that stops the LKAS when the deviation d is equal to or greater than the threshold value Th. As a result, it is possible to improve continuity of the LKAS, especially when the vehicle M travels in a lane with a wide lane width.

Incidentally, generally, while the vehicle M is traveling, occupants of the vehicle M are notified with either a lane departure warning when the LKAS is executed or a lane departure warning when the LKAS is stopped. Here, the lane departure warning refers to a warning issued by the HMI 30 to warn the occupants of lane departure at a timing when TTLC becomes equal to or less than a predetermined value. Hereinafter, with reference to FIG. 4, a time relationship between a stop timing of the LKAS and a notification timing of these lane departure warnings will be described.

Figure 4:
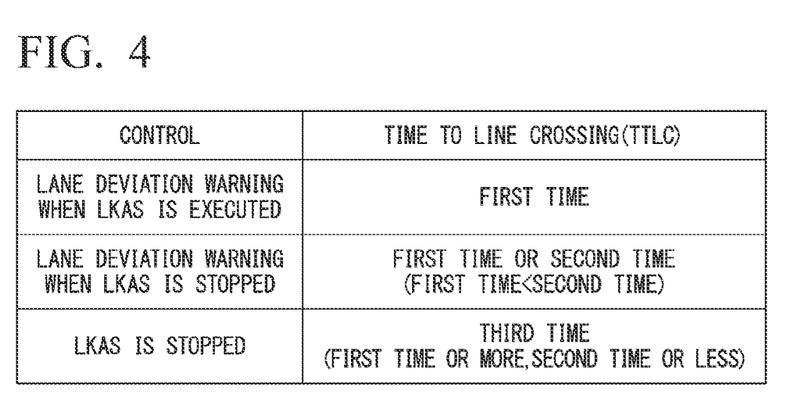
FIG. 4 is a diagram which shows a time relationship between a stop timing of the LKAS and a notification timing of a lane departure warning.

FIG. 4 is a diagram which shows a time relationship between the stop timing of the LKAS and the notification timing of the lane departure warning. The lane departure warning according to the present embodiment includes a lane departure warning that is notified when the LKAS is executed (hereinafter referred to as a "deviation warning when the LKAS is executed"), and a lane departure warning that is notified when the LKAS is stopped (hereinafter referred to as a "departure warning when the LKAS is stopped"). As shown in FIG. 4, the deviation warning when the LKAS is executed is notified at a timing when the TTLC becomes a first time, while the deviation warning when the LKAS is stopped is notified at a timing when the TTLC becomes the first time or a second time (here, it is assumed that the first time<the second time). In other words, when the notification timing of the deviation warning when the LKAS is stopped is set to the second time, a lane departure warning will be notified at a timing when the vehicle M is positioned closer to the center of the lane than to the road marking line (that is, an earlier timing) when the LKAS is stopped than when the LKAS is executed.

Based on the notification timing of the lane departure warning described above, in the present embodiment, the LKAS is stopped at a timing when the TTLC becomes a third time (the first time or more and the second time or less). That is, the LKAS is stopped at a timing when the vehicle M is positioned closer to the center of the lane than to the road marking line (that is, at an earlier timing), compared to a deviation warning when the LKAS is executed. In this case, the LKAS is stopped before the deviation warning when the LKAS is executed is notified, and the driving operation is handed over to the occupant of the vehicle M, so that operability of the occupant can be improved. The third time is an example of the "predetermined time."

Furthermore, according to the configuration described above, the LKAS will be stopped at a timing when the vehicle M is positioned closer to the road marking line than to the center of the lane (that is, at a later timing), compared to the deviation warning when the LKAS is stopped. In general, the notification timing of the deviation warning when the LKAS is stopped is set with a large margin until the vehicle departs from the lane. For this reason, by setting stopping of the LKAS to be performed later than this timing, the operability of the occupant can be improved.

Figure 5:
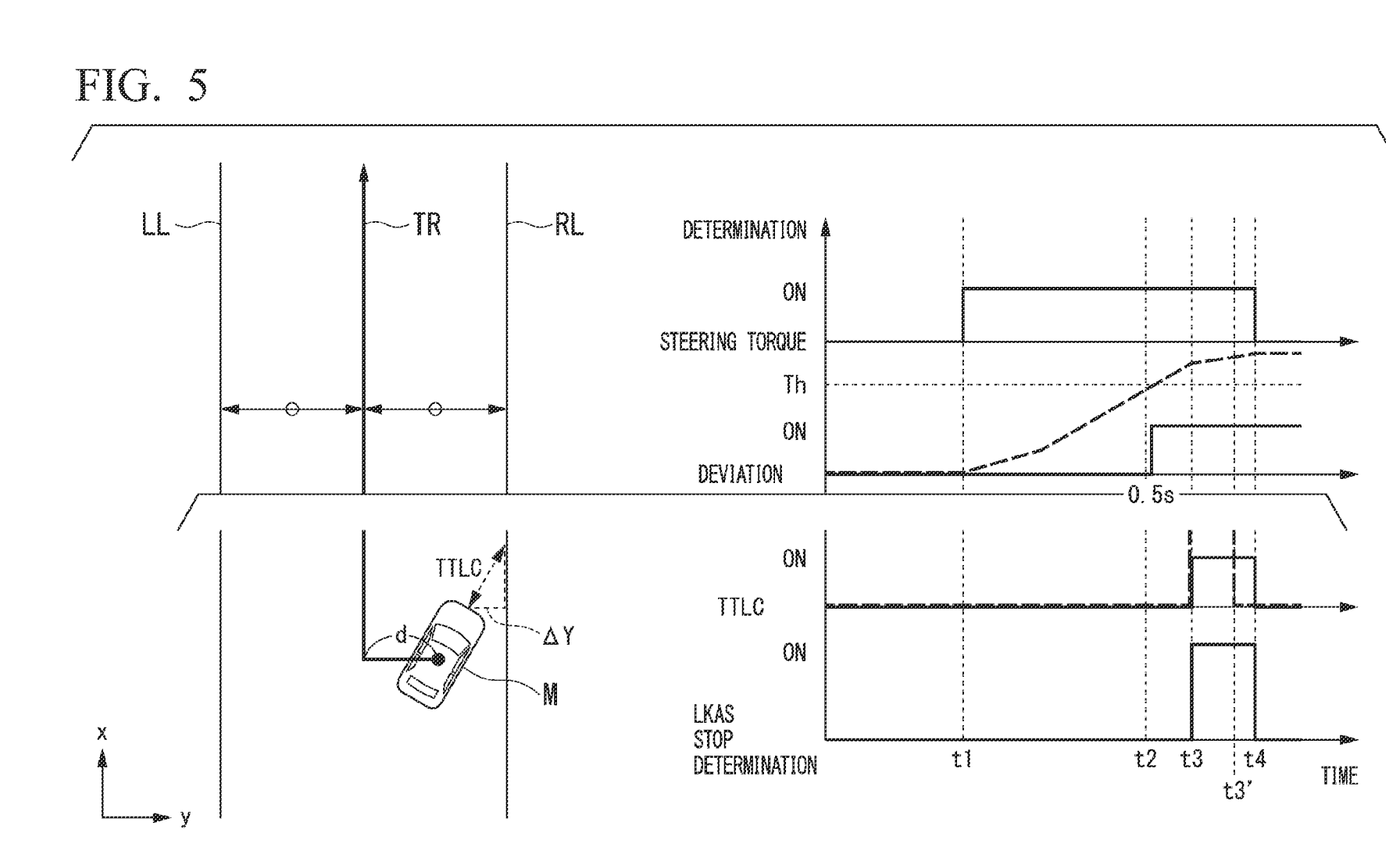
FIG. 5 is a diagram for describing an example of control by a control unit according to a surrounding situation of the vehicle M.

Next, control by the control unit 120 according to the surrounding situation of the vehicle M will be described with reference to FIGS. 5 to 7. FIG. 5 is a diagram for describing an example of the control by the control unit 120 according to the surrounding situation of the vehicle M. A left side of FIG. 5 represents a situation in which the vehicle M is traveling in a lane with a wide lane width, and a right side of FIG. 5 represents the control by the control unit 120 according to the situation.

First, at a time t1, the control unit 120 detects that the steering torque detected by the torque sensor 224 is in a direction that deviates from the target route TR, and detects that it continuously in the direction that deviates from the target route TR during a period from the time t1 to a time t4. Next, at a time t2, the control unit 120 detects that the deviation d is equal to or greater than the threshold value Th, and then detects that a period during which the deviation d is equal to or greater than the threshold value Th has continued for a specified time value (0.5 seconds in FIG. 5) or more.

Next, the control unit 120 detects that the TTLC has become equal to or less than a predetermined time at a time t3. That is, since the control unit 120 determines that the detected steering torque is in the direction that deviates from the target route TR, the calculated deviation d is equal to or greater than the threshold value Th, and the TTLC is equal to or less than the predetermined time at the time t3, the LKAS is stopped. Thereafter, the control unit 120 detects that the detected steering torque is not in the direction that deviates from the target route TR, and restores the LKAS at the time t4.

In a timing chart shown on the right side of FIG. 5, even after the control unit detects that the TTLC is not equal to or less than the predetermined time at a time t3', it continuously determines that the TTLC is equal to or less than the predetermined time while steering torque of the occupant of the vehicle M is detected in the direction of deviation. This is to prevent a situation in which conditions related to the TTLC are always not satisfied and the LKAS is not stopped when the vehicle M is traveling in a lane with a narrow lane width and deviates from the lane before the deviation d becomes equal to or greater than the threshold value Th.

Figure 6:
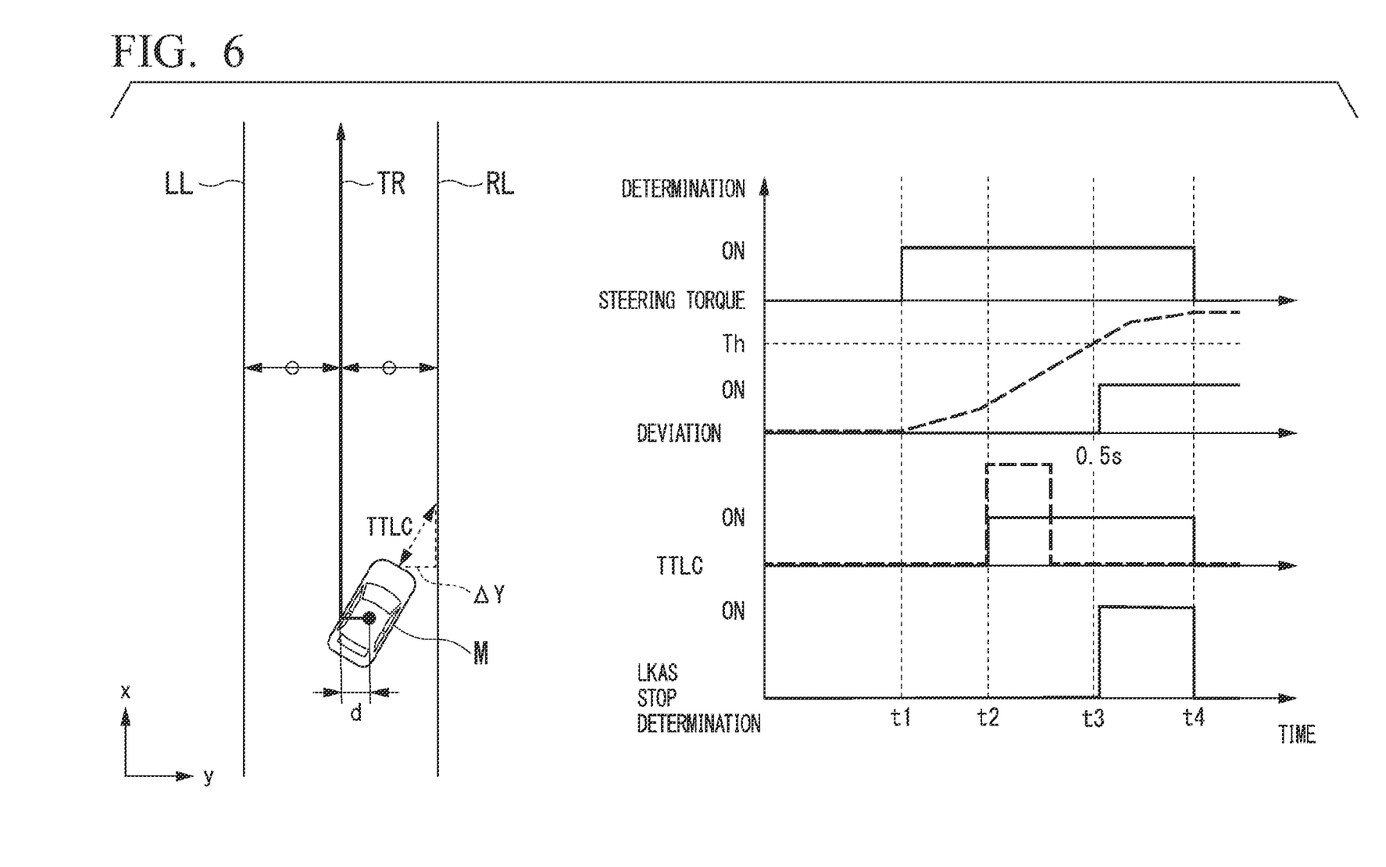
FIG. 6 is a diagram for describing another example of the control by the control unit according to the surrounding situation of the vehicle M.

FIG. 6 is a diagram for describing another example of the control by the control unit 120 according to the surrounding situation of the vehicle M. A left side of FIG. 6 represents a situation in which the vehicle M is traveling in a lane with a narrow lane width, and a right side of FIG. 6 represents control by the control unit 120 according to the situation.

First, at the time t1, the control unit 120 detects that the steering torque detected by the torque sensor 224 is in the direction that deviates from the target route TR, and detects that the steering torque is continuously in the direction that deviates from the target route TR during the period from the time t1 to the time t4. Next, at the time t2, the control unit 120 detects that the TTLC has become equal to or less than the predetermined time. This is because, unlike the situation shown in FIG. 5, the vehicle M is traveling in a lane with a narrow lane width.

Next, at the time t3, the control unit 120 detects that the deviation d is equal to or greater than the threshold value Th, and then detects that the period during which the deviation d is equal to or greater than the threshold value Th has continued for a specified time value (0.5 seconds in FIG. 6) or more. At this time, for example, due to a lane departure of the vehicle M, the conditions related to the TTLC are not satisfied, but as described above, the control unit 120 continuously determines that the TTLC is equal to or less than the predetermined time while the steering torque is detected. As a result, at a timing when a predetermined time has elapsed from the time t3, since the control unit determines that the detected steering torque is in the direction that deviates from the target route TR, the calculated deviation d is equal to or greater than the threshold value Th, and the TTLC is equal to or less than the predetermined time, the LKAS is stopped. Thereafter, at the time t4, the control unit 120 detects that the detected steering torque is not in the direction that deviates from the target route TR, and restores the LKAS.

As described above, according to the present embodiment, even if the conditions related to the TTLC are not satisfied before the deviation d becomes equal to or greater than the threshold value Th due to the vehicle M traveling on a lane with a narrow lane width, determination that the LKAS is to be stopped can be appropriately executed when it is continuously determined that the TTLC is equal to or less than the predetermined time for a certain period of time.

Figure 7:
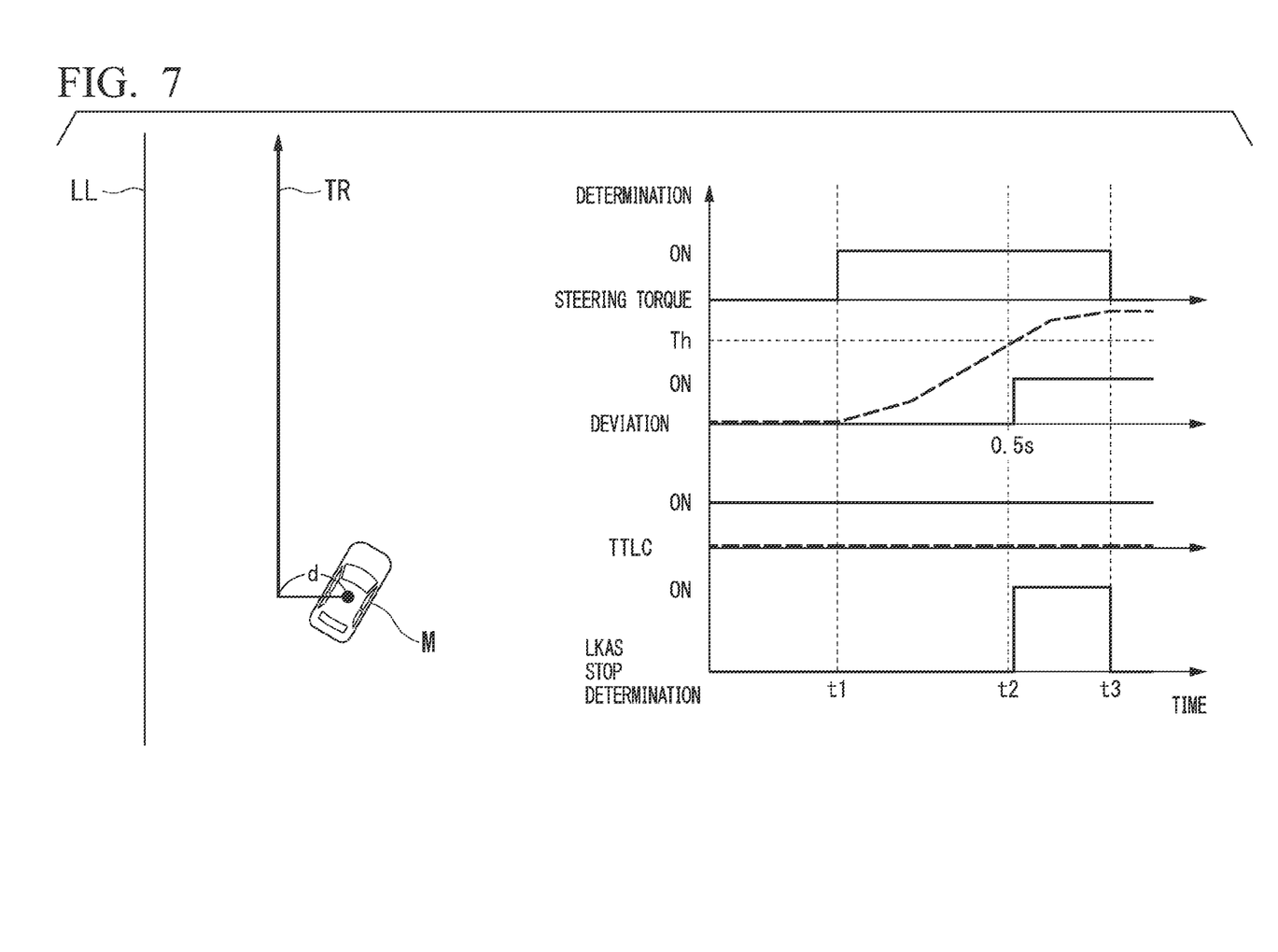
FIG. 7 is a diagram for describing still another example of the control by the control unit according to the surrounding situation of the vehicle M.

FIG. 7 is a diagram for describing another example of the control by the control unit 120 according to the surrounding situation of the vehicle M. A left side of FIG. 7 represents a situation in which the vehicle M is traveling in a lane where the right road marking line RL is not present (or whose recognition has failed), and a right side of FIG. represents control by the control unit 120 according to the situation.

As shown on the right side of FIG. 7, the control unit 120 assumes that the conditions related to the TTLC are always satisfied (ON) when the vehicle M does not recognize a road marking line in the direction that deviates from the target route TR. In other words, the control unit 120 executes the stop determination of the LKAS on the basis of only the steering torque and the deviation d.

First, at the time t1, the control unit 120 detects that the steering torque detected by the torque sensor 224 is in the direction that deviates from the target route TR, and detects that the steering torque is continuously in the direction that deviates from the target route TR during the period from the time t1 to the time t3. Next, at a timing when a predetermined time has elapsed from the time t2, since the control unit 120 determines that the detected steering torque is in the direction that deviates from the target route TR, and that the calculated deviation d is equal to or greater than the threshold value Th, the LKAS is stopped. Thereafter, at the time t3, the control unit 120 detects that the detected steering torque is not in the direction that deviates from the target route TR, and restores the LKAS. As described above, according to the present embodiment, even if a road marking line is not recognized in the direction that deviates from the target route TR, the stop determination of the LKAS can be appropriately executed on the basis of the steering torque and the deviation d.

Figure 8:
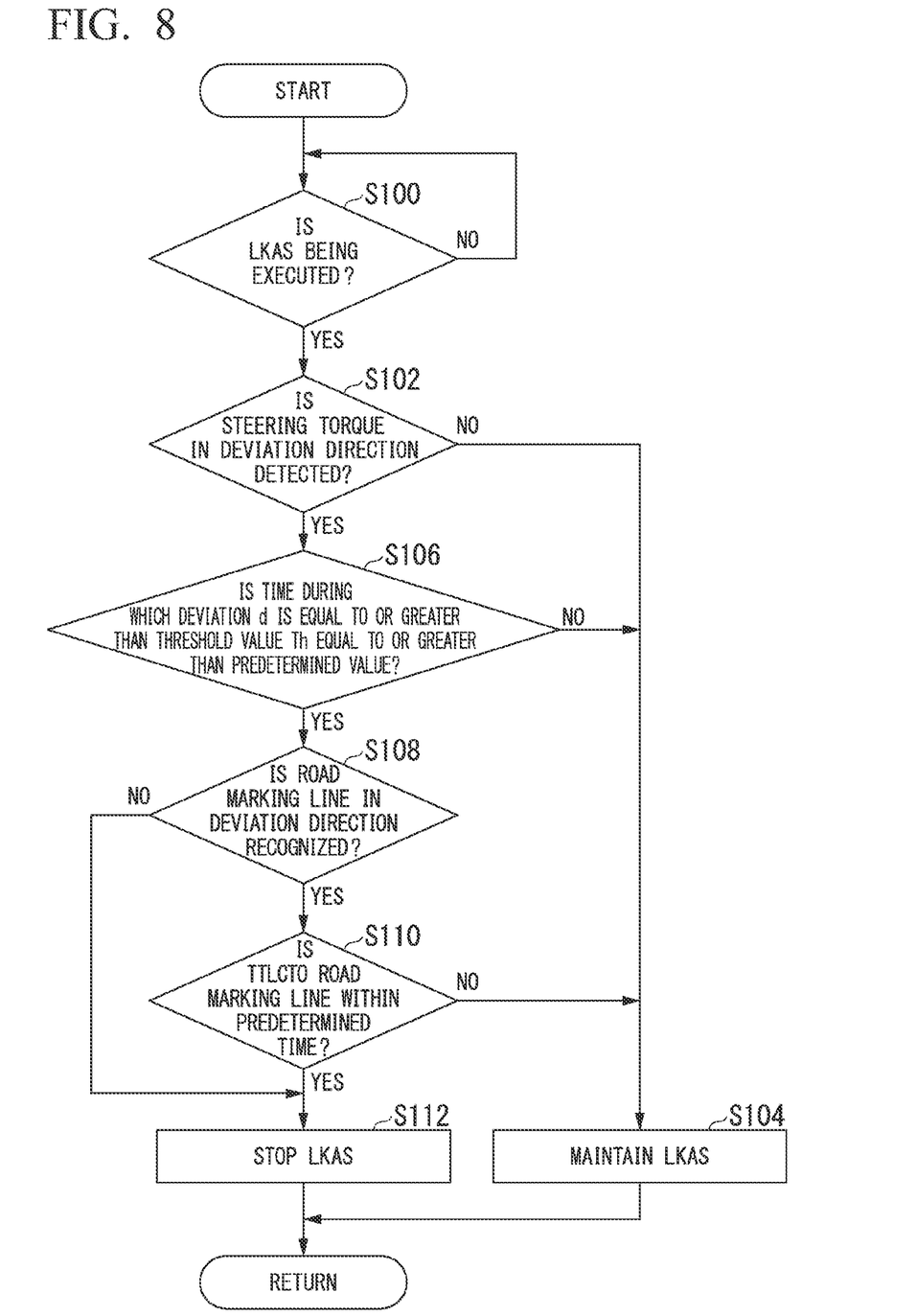
FIG. 8 is a flowchart which shows an example of a flow of processing executed by the control unit.

Next, a flow of processing executed by the control unit 120 will be described with reference to FIG. 8. FIG. 8 is a flowchart which shows an example of the flow of processing executed by the control unit 120. The processing according to the flowchart in FIG. 8 is repeatedly executed while the vehicle M is traveling.

First, the control unit 120 determines whether LKAS is being executed (step S100). When it is not determined that the LKAS is being executed, the control unit 120 returns the processing to step S100. When it is determined that the LKAS is being executed, the control unit 120 next determines whether the steering torque detected by the torque sensor 224 is in a direction that deviates from the target route TR (step S102). When it is determined that the steering torque detected by the torque sensor 224 is not in the direction that deviates from the target route TR, the control unit 120 keeps the LKAS (step S104).

On the other hand, when it is determined that the steering torque detected by the torque sensor 224 is in the direction that deviates from the target route TR, the control unit 120 next determines whether the period during which the deviation d is equal to or greater than the threshold value Th is equal to or greater than a specified time value (step S106). When it is determined that the period during which the deviation d is equal to or greater than the threshold value Th is not equal to or greater than the specified time value, the control unit 120 maintains the LKAS (step S104). On the other hand, when it is determined that the period during which the deviation d is equal to or greater than the threshold value Th is equal to or greater than the specified time value, the control unit determines whether the vehicle M has recognized a road marking line in the direction that deviates from the target route TR (step S108).

When it is determined that the vehicle M has recognized a road marking line in the direction that deviates from the target route TR, the control unit 120 determines whether the TTLC to the recognized road marking line is within a predetermined time (step S110). When it is determined that the TTLC to the recognized road marking line is not within the predetermined time, the control unit 120 maintains the LKAS (step S104). On the other hand, when it is determined that the TTLC to the recognized road marking line is within the predetermined time, the control unit 120 stops the LKAS (step S112). As a result, the processing of this flowchart ends.

Note that in the flowchart described above, an order of the processing in step S102 related to the steering torque, the processing in step S106 related to the deviation d, and the processing in step S108 and step S110 related to the TTLC may be interchanged.

According to the present embodiment described above, when it is determined that a deviation between a traveling position and a target route of a vehicle is equal to or greater than a threshold value, and a time required for the vehicle to deviate from the traveling lane is equal to or less than a predetermined time, the LKAS is stopped. That is, according to the present embodiment, the LKAS is stopped in consideration of a lane width of a lane in which the vehicle is traveling, and thereby it is possible to improve continuity of lane keeping control for vehicles.

Embodiments described above can be expressed as follows.

A vehicle control device is configured to include a storage medium that stores computer-readable instructions and a processor connected to the storage medium, wherein the processor executes the computer-readable instructions to recognize a surrounding situation of a vehicle, generate a target route of the vehicle on the basis of the recognized surrounding situation and perform steering control of the vehicle along the target route, and stop the steering control when it is determined that a deviation between a traveling position of the vehicle and the target route is equal to or greater than a threshold value, and a time taken until the vehicle deviates from the traveling lane of the vehicle is equal to or less than a predetermined time.

Although a mode for carrying out the present invention has been described above using the embodiment, the present invention is not limited to the embodiment, and various modifications and substitutions can be made within a range not departing from the gist of the present invention.

What is claimed is:

1. A vehicle control device comprising:
a storage medium configured to store a computer-readable instructions; and
a processor connected to the storage medium,
wherein the processor executes the computer-readable instruction, thereby recognizing a surrounding situation of a vehicle,
generating a target route of the vehicle on the basis of the recognized surrounding situation and performing steering control of the vehicle along the target route, and
stopping, by the processor, the steering control when it is determined that a deviation between a traveling position of the vehicle and the target route is equal to or greater than a threshold value, and a time taken until the vehicle deviates from the traveling lane of the vehicle is equal to or less than a predetermined time.

2. The vehicle control device according to claim 1,
wherein the processor causes a warning device to operate when it is determined that the time taken until the vehicle deviates from the traveling lane of the vehicle is equal to or less than a warning transmission time, and
the predetermined time is a time longer than the warning transmission time.

3. The vehicle control device according to claim 2,
wherein the predetermined time is a time longer than the warning transmission time during the steering control.

4. The vehicle control device according to claim 2,
wherein the predetermined time is a time shorter than the warning transmission time while the steering control is stopped.

5. The vehicle control device according to claim 4,
wherein the warning transmission time while the steering control is stopped is set to one of a first time and a second time longer than the first time, and
the predetermined time is set as a time between the first time and the second time.

6. The vehicle control device according to claim 1,
wherein, when the time is equal to or less than the predetermined time and it is determined that steering of the occupant of the vehicle is detected, even if a traveling position of the vehicle changes to a position where the time is longer than the predetermined time, the processor continuously determines that the time is equal to or less than the predetermined time while the steering of the occupant is detected.

7. The vehicle control device according to claim 1,
wherein the steering control is a control that applies a reaction force to a steering torque applied by an occupant of the vehicle to cause the vehicle to travel along the traveling lane.

8. A vehicle control method comprising:
by a computer,
recognizing a surrounding situation of a vehicle;
generating a target route of the vehicle on the basis of the recognized surrounding situation and performing steering control of the vehicle along the target route, and
stopping the steering control when it is determined that a deviation between a traveling position of the vehicle and the target route is equal to or greater than a threshold value, and a time taken until the vehicle deviates from the traveling lane of the vehicle is equal to or less than a predetermined time.

9. A computer-readable non-transitory storage medium that stores a program causing a computer to execute:
recognizing a surrounding situation of a vehicle;
generating a target route of the vehicle on the basis of the recognized surrounding situation and performing steering control of the vehicle along the target route, and
stopping the steering control when it is determined that a deviation between a traveling position of the vehicle and the target route is equal to or greater than a threshold value, and a time taken until the vehicle deviates from the traveling lane of the vehicle is equal to or less than a predetermined time.

* * * * *